United States Patent
Ikeda et al.

(10) Patent No.: US 10,145,486 B2
(45) Date of Patent: Dec. 4, 2018

(54) DRIVE DEVICE, METHOD OF CONTROLLING STRAIN AND COMPUTER READABLE MEDIUM STORING PROGRAM

(71) Applicant: Konica Minolta, Inc., Chiyoda-ku, Tokyo (JP)

(72) Inventors: Kazuki Ikeda, Hachioji (JP); Takashi Kurosawa, Hachioji (JP); Hideo Uemura, Hachioji (JP); Makoto Ooki, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 185 days.

(21) Appl. No.: 15/410,824

(22) Filed: Jan. 20, 2017

(65) Prior Publication Data
US 2017/0227934 A1     Aug. 10, 2017

(30) Foreign Application Priority Data
Feb. 4, 2016  (JP) .................... 2016-019387

(51) Int. Cl.
  *G01B 11/16*   (2006.01)
  *F16K 31/02*   (2006.01)

(52) U.S. Cl.
  CPC .......... *F16K 31/02* (2013.01); *G01B 11/16* (2013.01)

(58) Field of Classification Search
  CPC .................... G01B 11/16; F16K 31/02
  USPC ................................................ 356/32
  See application file for complete search history.

(56) References Cited

U.S. PATENT DOCUMENTS

| | | | | | |
|---|---|---|---|---|---|
| 3,216,312 | A | * | 11/1965 | Oppel | G01B 11/18 356/33 |
| 3,313,204 | A | * | 4/1967 | Oppel | G01B 11/168 356/34 |
| 3,994,598 | A | * | 11/1976 | Reytblatt | G01B 11/18 356/34 |
| 4,008,960 | A | * | 2/1977 | Reytblatt | G01B 11/18 356/33 |
| 4,777,358 | A | * | 10/1988 | Nelson | G01L 1/241 250/225 |
| 5,789,680 | A | * | 8/1998 | Fujimoto | G01N 3/32 73/786 |

(Continued)

FOREIGN PATENT DOCUMENTS

| | | |
|---|---|---|
| JP | 07-321385 A | 12/1995 |
| JP | 2011-072180 A | 4/2011 |

*Primary Examiner* — Roy M Punnoose
(74) *Attorney, Agent, or Firm* — Buchanan Ingersoll & Rooney PC

(57) ABSTRACT

A drive device includes a drive member, a light source, a marker, a detector, a signal processor and a strain controller. The drive member includes at least a material which generates a plasmon. The drive member generates strain in response to input energy. The marker is formed on a surface of the drive member. Strain occurs in the marker in accordance with a deformation of the drive member and the marker reflects or transmits light emitted from the light source. The detector detects a light intensity of light reflected from or transmitted through the marker. The signal processor calculates an amount of strain which occurs in the marker based on the light intensity. The strain controller controls an amount of strain of the drive member based on the amount of strain calculated by the signal processor.

10 Claims, 7 Drawing Sheets

(56) References Cited

U.S. PATENT DOCUMENTS

| | | | |
|---|---|---|---|
| 6,943,869 B2* | 9/2005 | Hubner | G01B 11/18 356/34 |
| 7,509,872 B2* | 3/2009 | Hyodo | G01N 3/068 356/34 |
| 8,432,537 B2* | 4/2013 | Lam | G01B 11/168 356/35 |
| 9,316,488 B1* | 4/2016 | Sternowski | G01B 11/16 |
| 9,423,243 B1* | 8/2016 | Ikeda | G01B 11/168 |
| 2004/0066503 A1* | 4/2004 | Hubner | G01B 11/18 356/34 |
| 2006/0007424 A1* | 1/2006 | Hubner | G01B 11/18 356/34 |
| 2015/0029511 A1* | 1/2015 | 'T Hooft | G01B 11/16 356/477 |
| 2016/0305770 A1* | 10/2016 | Burnside | G01B 11/16 |

* cited by examiner

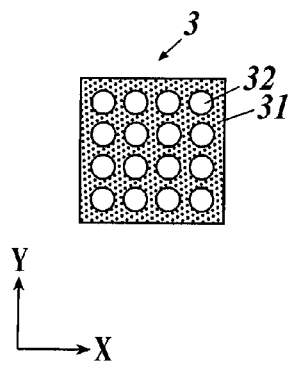 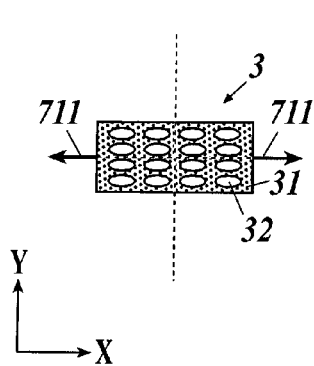 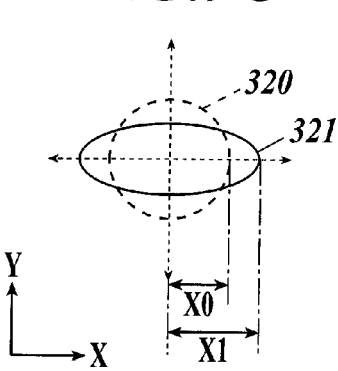
FIG.9A  FIG.9B  FIG.9C
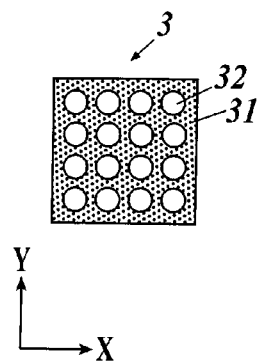 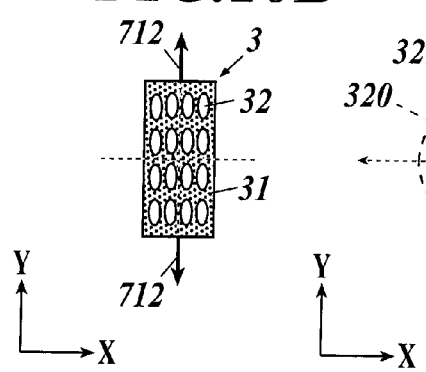 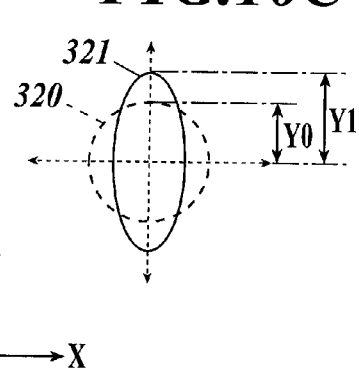
FIG.10A  FIG.10B  FIG.10C
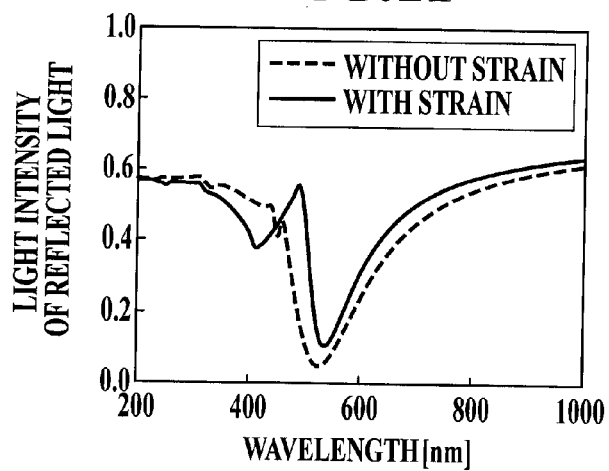
FIG.11

DRIVE DEVICE, METHOD OF CONTROLLING STRAIN AND COMPUTER READABLE MEDIUM STORING PROGRAM

BACKGROUND OF THE INVENTION

1. Field of the Invention

The present invention relates to a drive device, a method of controlling strain and a computer readable medium storing a program.

2. Description of Related Art

Recent years, the need for the technology to detect strain which occurs in a drive unit as typified by an actuator is growing. For example, in the case of a robot hand, the amount of strain needs to be strictly controlled for gripping an object more properly and accurately. Thus, a unit for detecting strain of a drive unit is necessary. Presently, electrical-type strain gages are major units for detecting strain. An electrical-type strain gauge is a mechanical sensor which can calculate the amount of strain by measuring the change of electrical resistance due to a deformation.

As an example of an electrical-type strain gauge, a technique is disclosed which reduces measurement errors to enable high precision uniaxial displacement measurement (for example, refer to JP H07-321385 A).

Also, a technique is disclosed which reduces the influence caused by the operation of an actuator to improve the detection accuracy of a sensor (for example, refer to JP 2011-072180 A).

In the techniques described in JP H07-321385 A and JP 2011-072180 A, a sensor is attached to a drive unit to detect the strain of the drive unit and the strain of the drive unit is controlled based on the detected value.

In order to detect strain, there is also a method called a moire method. In the moire method, a grid pattern is drawn on the surface of the drive unit, and strain is detected by carrying out an image analysis with respect to the change of the grid pattern.

In general, when strain of a drive unit is detected, transmitting the detected information on strain to a signal processing unit causing as small time lag as possible is important. Also, since a drive unit frequently undergoes impact resulting from external force or the like, countermeasure against impact is necessary. As described above, rapid detection and high impact resistance are required to a section for detecting strain in a drive unit.

However, in the prior art, there is no detection unit which satisfies the two performances described above (rapid detection and high impact resistance) at the same time.

For example, electrical-type strain gauges described in JP H07-321385 A and JP 2011-072180 A can detect strain rapidly. However, since these strain gauges are formed to be very fragile not to disrupt driving, they have low impact resistance and easy to be broken.

In case where moire method is adopted, since a grid pattern is directly inscribed on a drive body, high impact resistance can be expected. However, since carrying an image analysis takes time, there is a problem that detection rate is low.

SUMMARY OF THE INVENTION

The present invention is made considering the circumstances described above. An object of the present invention is to provide a drive device and a method of controlling strain while rapid detection and high impact resistance are realized at the same time.

To achieve at least one of the objects described above, according to one aspect of the present invention, there is provided A drive device including: a drive member which includes at least a material which generates a plasmon, the drive member generating strain in response to input energy; a light source which emits light; a marker formed on a surface of the drive member, wherein strain occurs in the marker in accordance with a deformation of the drive member and the marker reflects or transmits light emitted from the light source; a detector which detects a light intensity of light reflected from or transmitted through the marker; a signal processor which calculates an amount of strain which occurs in the marker based on the light intensity detected by the detector; and a strain controller which controls an amount of strain of the drive member based on the amount of strain calculated by the signal processing unit, wherein the marker includes, on the surface of the drive member, a periodic fine structure, a size of the fine structure being equal to or smaller than a wavelength of light emitted from the light source.

Preferably, in the drive device, the drive member and the marker are composed of a material including at least a hydrogen storage alloy.

Preferably, in the drive device, the hydrogen storage alloy is an alloy including palladium.

Preferably, in the drive device, the marker is formed integrally with the drive member.

Preferably, in the drive device, the marker includes a flat plate including a first medium and a second medium, a refractive index of the first medium and a refractive index of the second medium being different from each other, the second medium is periodically arranged in the first medium, and a maximum length of the second medium in a direction parallel with a light receiving surface of the marker is shorter than a wavelength of light emitted from the light source.

Preferably, in the drive device, the light source emits a plurality of light fluxes polarized in directions different from each other, the detector further detects a polarization direction of light reflected from or transmitted through the marker, and the signal processor calculates a direction of strain which occurs in the marker based on the light intensity and the polarization direction detected by the detection member.

Preferably, in the drive device, the second medium is arranged such that at least one second medium exists in a direction parallel with a direction of deformation of the marker.

Preferably, in the drive device, gas is accommodated in an area where the second medium is to be accommodated.

To achieve one of the objects described above, according to one aspect of the present invention, there is provided a method of controlling strain of a drive device including a drive member which includes at least a material which generates a plasmon, the drive member generating strain in response to input energy; a light source which emits light; a marker formed on a surface of the drive member, wherein strain occurs in the marker in accordance with a deformation of the drive member and the marker reflects or transmits light emitted from the light source and wherein the marker includes a periodic fine structure, a size of the fine structure being equal to or smaller than a wavelength of light emitted from the light source, the method including steps of: detecting a light intensity of light reflected from or transmitted through the marker; calculating an amount of strain which occurs in the marker based on the detected light intensity; and controlling an amount of strain of the drive member based on the calculated amount of strain.

To achieve one of the objects described above, according to one aspect of the present invention, there is provided a non-transitory computer readable storage medium storing a program thereon which causes a computer of a drive device including a drive member which includes at least a material which generates a plasmon, the drive member generating strain in response to input energy; a light source which emits light; a marker formed on a surface of the drive member, wherein strain occurs in the marker in accordance with a deformation of the drive member and the marker reflects or transmits light emitted from the light source and wherein the marker includes a periodic fine structure, a size of the fine structure being equal to or smaller than a wavelength of light emitted from the light source, to function as units, including: a detector which detects a light intensity of light reflected from or transmitted through the marker; a signal processor which calculates an amount of strain which occurs in the marker based on the light intensity detected by the detector; and a strain controller which controls an amount of strain of the drive member based on the amount of strain calculated by the signal processor.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 9A is a plan view of the marker before a deformation in X direction occurs therein;

FIG. 9B is a plan view of the marker when the deformation in X direction occurs therein;

FIG. 9C is a plan view of the second medium when the deformation in X direction occurs in the marker;

FIG. 10A is a plan view of the marker before a deformation in Y direction occurs therein;

FIG. 10B is a plan view of the marker when the deformation in Y direction occurs therein;

FIG. 10C is a plan view of the second medium when the deformation in Y direction occurs in the marker;

FIG. 11 is a view showing a change of spectrum of reflected light resulting from strain of the marker;

DESCRIPTION OF THE PREFERRED EMBODIMENTS

Figure 1:
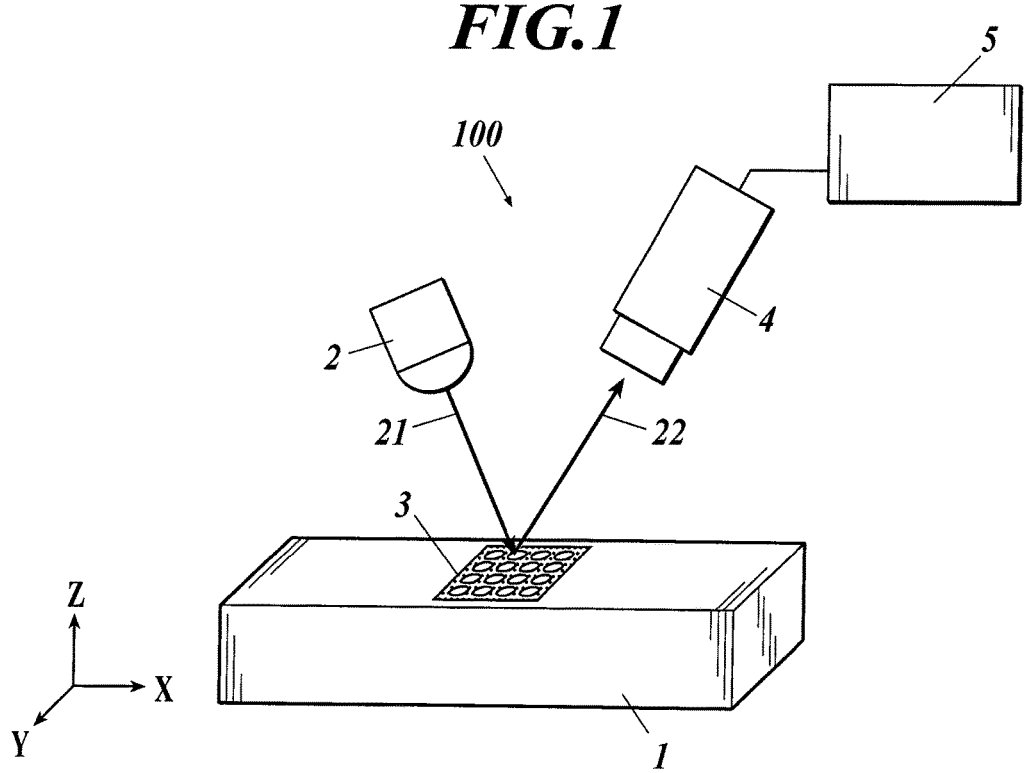
FIG. 1 is a view showing a schematic configuration of a drive device according to the present embodiment.

An embodiment of the present invention will be described in detail with reference to the drawings in the following. In the following description, the left to right direction in FIG. 1 is defined as X direction, the down to up direction in FIG. 1 is defined as Z direction, and the direction perpendicular to X direction and Z direction (rear to front direction) is defined as Y direction.

Figure 2:
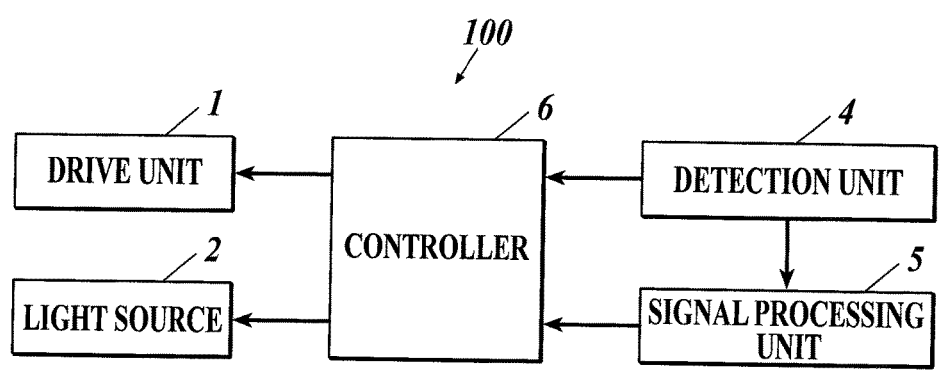
FIG. 2 is a functional block diagram showing a control configuration of the drive device according to the present embodiment.

A drive device 100 according to the present embodiment is a sensor which is able to measure strain occurring in a drive unit 1 with use of light. As shown in FIGS. 1 and 2, the drive device 100 includes the drive unit 1 which generates strain passively or actively based on input energy (external source, external energy), a light source 2 disposed above the drive unit 1 in Z direction, a marker 3 which is integrally formed on the surface of the drive unit 1 by microfabrication and which reflects light emitted from the light source 2, a detection unit 4 which is disposed above the drive unit 1 in Z direction and which detects light reflected by the marker 3, a signal processing unit 5 which measures the strain of the drive unit 1 based on light detected by the detection unit 4, and a controller 6 (refer to FIG. 2).

Figure 3:
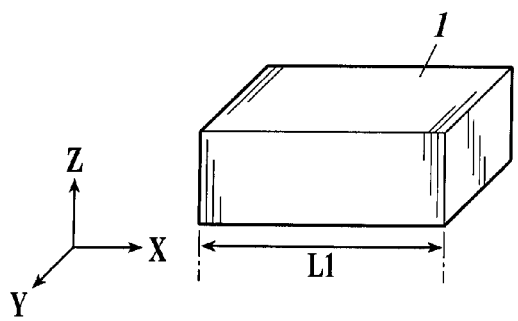
FIG. 3 is a perspective view showing a configuration of a drive unit.
Figure 4:
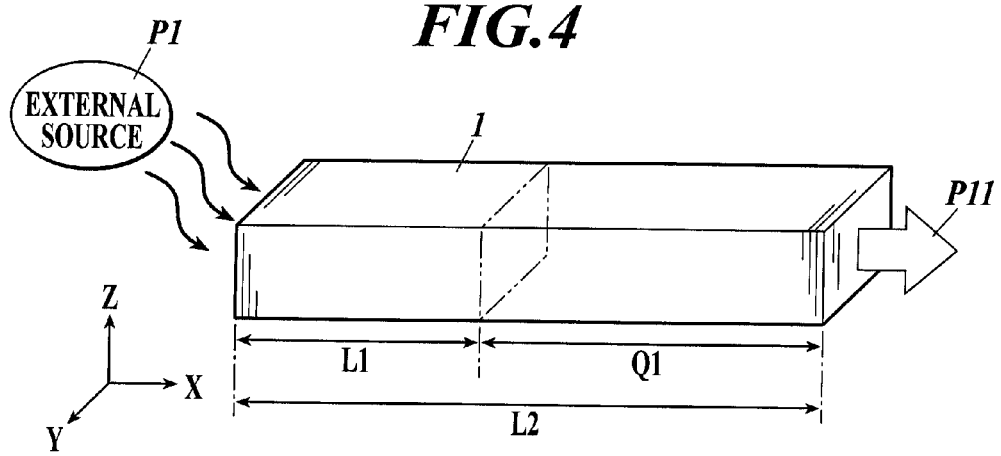
FIG. 4 is a view showing an example of a behavior when an output from an external source is input to the drive unit shown in FIG. 3.

The drive unit 1 is a member which is able to output physical quantity such as strain, displacement and force by inputting the output from an external source P1 as shown in FIGS. 3 and 4. Specifically, the drive unit 1 generates displacement by inputting the output from an external source P1 as shown in FIG. 4 and the displacement generates force P11 resulting from the external source. The drive unit 1 generates displacement and force P11 resulting from external source via strain. Strain D1 is expressed by formula 1:

$$D1 = Q1/L1 \qquad (1)$$

where Q1 represents amount of displacement (resulting from the external source), L1 represents a length before the displacement and L2 represents a length after the displacement.

Since the amount of displacement Q1 is obtained by subtracting the length L1 before the displacement from the length L2 after the displacement, the strain D1 is expressed by formula 2:

$$D1 = (L2 - L1)/L1 \qquad (2)$$

Figure 5:
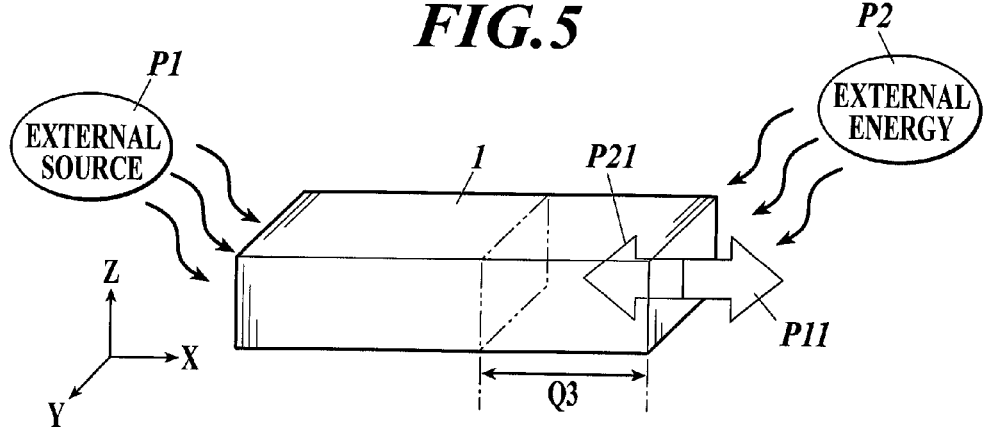
FIG. 5 is a view showing an example of a behavior when external energy other than the external source is input to the drive unit shown in FIG. 3.
Figure 6:
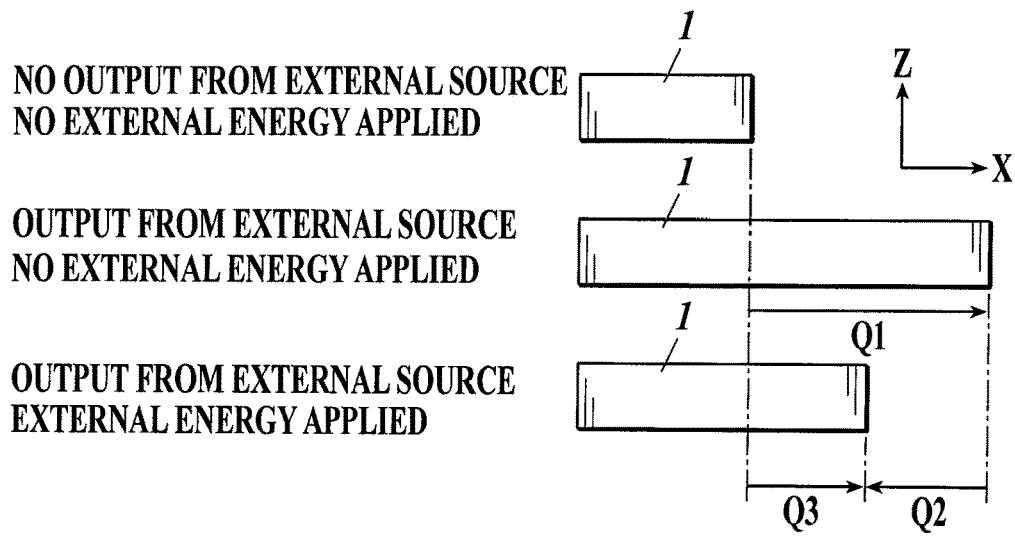
FIG. 6 is a side view of the drive unit shown in FIGS. 3 to 5.

FIG. 5 shows an example of behavior when external energy P2 occurs in the drive unit 1 other than the external source P1. FIG. 6 are side views of the drive unit each shown in FIGS. 3 to 5. In the example shown in FIG. 5, the output from the external source P1 and external energy P2 are input to the drive unit 1. The external energy P2 means energy such as temperature and load other than the external source P1 which causes the drive unit 1 to output strain and displacement. When the external energy P2 is input to the drive unit 1, strain and displacement are generated in the drive unit 1 and the occurrence of the strain and displacement generates force P21 resulting from the external energy.

Thus, as shown in FIG. 6, actual amount of displacement Q3 when the external energy P2 occurs is expressed by formula 3:

$$Q3=Q1+Q2 \tag{3}$$

where Q1 represents amount of displacement resulting from the external source and Q2 represents amount of displacement resulting from external energy.

That is, in order to exactly output the actual amount of displacement Q3 of the drive unit 1, detecting the amount of displacement Q2 resulting from external energy is necessary, and thus, a sensor which detects the strain of the drive unit 1 is necessary.

The drive unit 1 is a member formed of an alloy including palladium, for example. Palladium is one of hydrogen storage materials which is able to generate a plasmon phenomenon. A hydrogen storage material is a material which can undergo a volume change in accordance with adsorption and release of hydrogens corresponding to the external source P1 (hydrogen adsorption accompanied by volume increase and hydrogen release accompanied by volume decrease). That is, the drive unit 1 can output desired amount of strain by controlling hydrogen amount and/or temperature of palladium which is a hydrogen storage material.

The light source 2 emits a linearly polarized light flux (incident light 21) toward the marker 3 disposed below. The light source 2 emits a light flux having a wavelength of 1 μm or less.

Figure 7:
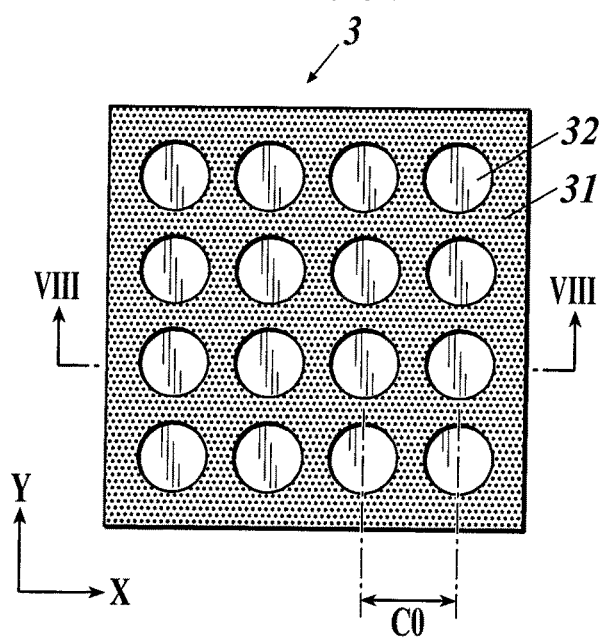
FIG. 7 is a plan view showing a configuration of a marker.
Figure 8:
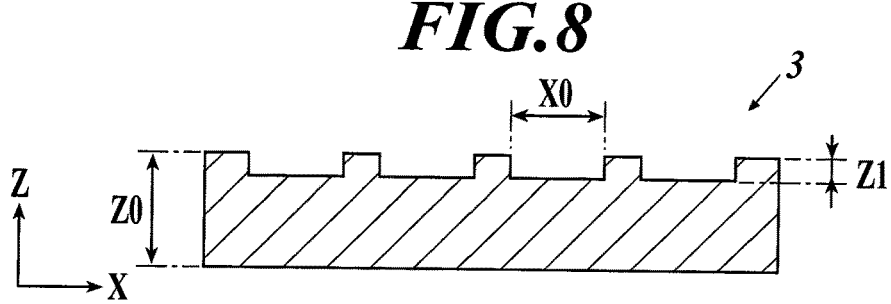
FIG. 8 is a view showing an example of a cross-section taken through line VIII-VIII shown in FIG. 7.

The marker 3 has a nano hole array structure in which uniform nanometer-size fine pores are periodically arranged. The light intensity of the light reflected from the nano hole array changes in accordance with the amount of strain generated by external energy (load, weight, heat, magnetic force, pressure, for example). As shown in FIGS. 7 and 8, the marker 3 includes a first medium 31 and a second medium 32 which are integrally formed on the surface of drive unit 1 by microfabrication and reflects light flux emitted from the light source 2. The refractive indices of the first medium 31 and the second medium 32 are different from each other.

The first medium 31 is a substantially square shaped plate member formed of an alloy including palladium, for example. The first medium 31 may be a metal such as aluminum, gold, silver, titanium and titanium oxide, a resin, an oxide semiconductor or the like. The areas which each accommodate the second medium 32 are formed in the first medium 31 so as to each have a true circle shape having the center axis in Z direction in a plan view.

The second medium 32 is formed of acrylic resin or the like. However, this is not limitative. For example, a gas may be accommodated in the area where the second medium 32 is accommodated. In this case, any gas may be tightly sealed. Air may be the second medium 32 by leaving the area for the second medium 32 empty.

As shown in FIGS. 9 and 10, the first medium 31 and the second medium 32 which constitute the marker 3 are deformed in response to external energy in parallel with the surface of the drive unit 1 (marker 3).

For example, as shown in FIGS. 9A and 9B, in a case where deformation and/or strain in X direction occurs in the marker 3 (X strain 711), strain and/or deformation in X direction is generated in the marker 3. As shown in FIG. 9C, when 320 represents the second medium before the strain and/or deformation of the marker 3, and 321 represents the second medium after the strain and/or deformation of the marker 3, the amount of strain generated in the marker 3 can be calculated in accordance with formula (4):

$$\varepsilon x=(X1-X0)/(X0) \tag{4}$$

where X0 represents the diameter of the second medium 320 before the strain and/or deformation and X1 represents the diameter of the second medium 321 after the strain and/or deformation.

FIGS. 10A, 10B and 10C shows that, in a case where deformation and/or strain in Y direction occurs in the marker 3 (Y strain 712), strain and/or deformation in Y direction is generated in the marker 3. As shown in FIG. 10C, when 320 represents the second medium before the strain and/or deformation of the marker 3, and 321 represents the second medium after the strain and/or deformation of the marker 3, the amount of strain generated in the marker 3 can be calculated in accordance with formula (5):

$$\varepsilon y=(Y1-Y0)/(Y0) \tag{5}$$

where Y0 represents the diameter of the second medium 320 before the strain and/or deformation and Y1 represents the diameter of the second medium 321 after the strain and/or deformation.

The detection unit 4 detects the light intensity of light flux reflected on the marker 3 (reflected light 22). The light intensity of the reflected light 22 detected by the detection unit 4 is output to the signal processing unit 5.

The signal processing unit 5 calculates the amount of strain of the drive unit 1 based on the light intensity of the reflected light 22 output from the detection unit 4. Specifically, the signal processing unit 5 calculates the amount of strain based on the table data which shows the correspondence between the light intensity and the amount of strain (refer to FIG. 12).

The controller 6 includes a central processing unit (CPU), a random access memory (RAM), a read only memory (ROM) and the like. The CPU opens in the RAM various programs stored in the ROM, and carries out the overall control of the operation of each component of the drive device 100 such as the drive unit 1, the light source 2, the detection unit 4 and the signal processing unit 5 (refer to FIG. 2).

Next, a method of calculating the amount of strain occurring at the marker 3 (drive unit 1) in the drive device 100 according to the present embodiment will be described in reference to FIGS. 11 and 12. The range of the amount of strain which can be measured depends on the wavelength of light emitted from the light source 2 and the size of the diameter X0 of the second medium 32. Therefore, the amount of strain caused by a nanometer-size deformation can be measured by setting the nanometer-size wavelength of light emitted from the light source 2 and the nanometer-size diameter X0 of the second medium 32. Needless to say, the amount of strain caused by microscopic or larger deformation can be measured by properly setting the wavelength of light emitted from the wavelength 2, the size of structures, the kind of material or the like.

EXAMPLE

In the example, such a marker 3 is used that the thickness Z0 of the first medium 31 is 1000 nm, the thickness Z1 of the second medium 32 is 200 nm, the diameter X0 of the second medium is 300 nm and the period C0 of the second medium 32 is 450 nm. Palladium (Pd) is used as the first medium 31 and air is used as the second medium 32. The light source 2 is used which emits light linearly polarized in X direction (the direction of strain of the marker 3) and whose peak wavelength is about 700 nm.

FIG. 11 shows the change in the spectrum of the reflected light caused by the strain of the marker 3. As shown in FIG. 11, when strain occurs in the marker 3, the intensity of reflected light changes in accordance with the direction of strain of the marker 3 (in this example, X direction). This is because, when strain occurs in the marker 3, the shape of the second medium 32 included in the marker 3 deforms, and the property (resonance condition) of surface plasmons generated on the surface of the marker 3 changes. That is, the amount of strain of the marker 3 and the intensity of reflected light are correlated. The amount of strain of the marker 3 can be calculated from the intensity of reflected light with use of this correlation.

Figure 12:
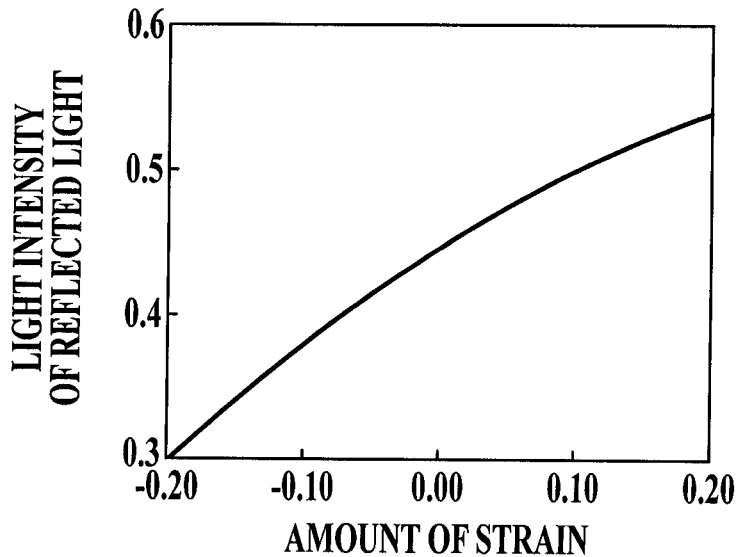
FIG. 12 is a view showing a correspondence between amount of stain of the marker in X direction and light intensity of reflected light.

FIG. 12 shows table data which shows the correspondence between the amount of strain of the marker 3 in X direction and the intensity of reflected light. The intensity of reflected light is calculated in accordance with "light intensity of reflected light 22/light intensity of incident light 21". In the example shown in FIG. 12, the intensity of reflected light at the wavelength 700 nm is plotted for each amount of strain. When the signal processing unit 5 has the table data shown in FIG. 12 prepared (input) in advance, the amount of strain generated in the marker 3 in X direction can be calculated based on the intensity of reflected light detected by the detection unit 4. For example, when the intensity of reflected light detected by the detection unit 4 is 0.50, the amount of strain (≈0.10) can be calculated corresponding to the intensity of reflected light 0.50 with reference to the table data shown in FIG. 12.

When the light source 2 is prepared which emits light polarizable in the direction of strain of the marker 3 and the signal processing unit 5 has table data for each of the direction of strain (polarization direction of light) in advance, the amount of strain generated in the marker 3 in any direction on XY plane can be calculated. For example, when calculating the amount of strain of the marker 3 in Y direction is necessary, by preparing the light source 2 which emits light linearly polarized in Y direction and the table data in which the correspondence between the amount of strain of the marker 3 in Y direction and the intensity of reflected light in the signal processing unit 5 is plotted in advance, calculating the amount of strain of the marker 3 in Y direction is possible.

Figure 13:
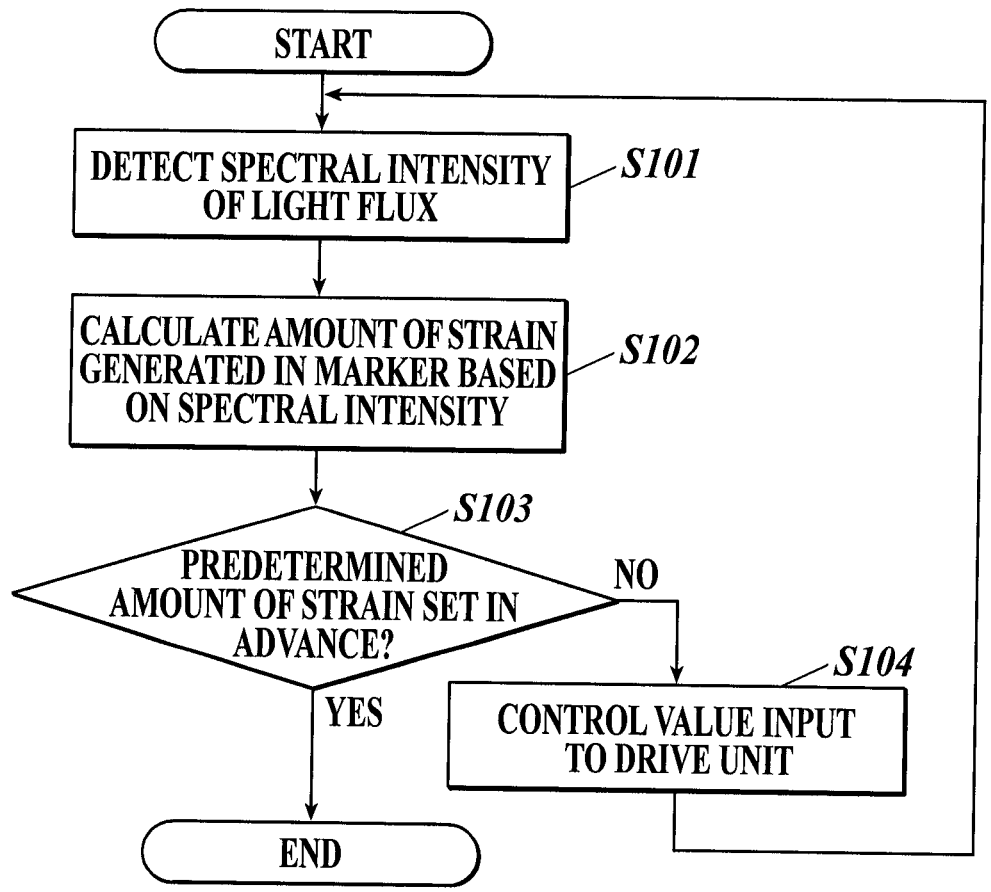
FIG. 13 is a flowchart showing an operation of the drive device according to the present embodiment.

Next, the operation of the drive device 100 according to the present embodiment will be explained with reference to the flowchart shown in FIG. 13.

The controller 6 controls the detection unit 4 to detect the spectral intensity of the light flux (reflected light 22) reflected from the marker 3 (Step S101).

Then, the controller 6 controls the signal processing unit 5 to calculate the amount of strain generated in the marker 3 based on the spectral intensity detected in Step S101 (Step S102).

The controller 6 determines if the amount of strain calculated in Step S102 is a predetermined amount of strain which is set in advance (Step S103). The predetermined amount of strain is the amount of strain resulting from the external source which a user desires, and is set in appropriate in accordance with the material of the drive unit 1, for example.

When the controller 6 determines that the calculated amount of strain is the predetermined amount of strain (Step S103; YES), the controller 6 ends the processing.

When the controller 6 determines that the calculated amount of strain is not the predetermined amount of strain (Step S103; NO), the controller controls the value input to the drive unit 1 based on the amount of strain calculated in Step S102 (Step S104) where the value input to the drive unit 1 is the value of the output from the external source P1 input to the drive unit 1. That is, the controller 6 controls the value of the output from the external source P1 input to the drive unit 1 such that the drive unit 1 outputs the predetermined amount of strain. The controller 6 functions as a strain controller of the present invention.

After the controller 6 controls the value input to the drive unit 1 at Step S104, the flow shifts the processing to Step S101 to repeat the processing.

The drive unit 1 can output the predetermined amount of strain by the processes described above.

As described above, a drive device 100 according to the present invention, includes: a drive unit 1 configured to include at least a material which generates a plasmon, the drive unit 1 generating strain in response to input energy; a light source 2 which emits light; a marker 3 formed on a surface of the drive unit 1, wherein strain occurs in the marker 3 in accordance with a deformation of the drive unit 1 and the marker 3 reflects or transmits light emitted from the light source 2; a detection unit 4 which detects a light intensity of light reflected from or transmitted through the marker 3; a signal processing unit 5 which calculates an amount of strain which occurs in the marker 3 based on the light intensity detected by the detection unit 4; and a strain controller (controller 6) which controls an amount of strain of the drive unit 1 based on the amount of strain calculated by the signal processing unit 5. Also, the marker 3 includes, on the surface of the drive unit 1, a periodic fine structure, a size of the fine structure being equal to or smaller than a wavelength of light emitted from the light source 2.

Thus, according to the drive device 100 of the present embodiment, since strain can be detected based on the change in the intensity of reflected light, strain can be detected rapidly without a complicated process such as an image analysis. Also, since a fine structure is provided on the surface of the drive unit 1 itself, even when an impact occurs due to external force or the like, the marker 3 is not damaged or detached, and strain can be detected stably.

Therefore, according to the drive device 100 of the present embodiment, strain can be detected while rapid detection and high impact resistance are realized at the same time.

In the drive device 100 according to the present embodiment, the drive unit 1 and the marker 3 are composed of a material including at least a hydrogen storage alloy.

Thus, according to the drive device 100 of the present embodiment, since complicated parts such as a gear, a compressor and a motor are not necessary, the configuration of the drive unit 1 can be made smaller. Also, since a hydrogen storage alloy can generate a plasmon, the strain of small drive unit 1 can be detected only by forming the micrometer-size marker 3 on the surface of the drive unit 1.

Therefore, according to the drive device 100 of the present embodiment, the feedback of strain to the controller 6 is possible while small drive unit 1 is realized.

In the drive device 100 according to the present embodiment, the hydrogen storage alloy is an alloy including palladium.

Thus, according to the drive device 100 of the present embodiment, since the coefficient of volume expansion of palladium is as large as about 300% when palladium storages hydrogen, palladium can output great force (strain) as the drive unit 1. Also, since palladium generates surface plasmon in the visible light region, the strain of the drive unit 1 can be detected easily.

Therefore, according to the drive device 100 of the present embodiment, both the output function and the strain detection function can be realized at a high level.

In the drive device according to the present embodiment, the marker 3 is formed integrally with the drive unit 1.

Thus, according to the drive device 100 of the present embodiment, since the elastic moduli of the drive unit 1 and marker 3 can be conformed to each other, even when the drive unit 1 is deformed, the occurrence of stress between the drive unit 1 and the marker 3 can be suppressed, and the fracture and degradation of the marker 3 can be suppressed. Also, since applying and fixing the marker 3 is not necessary, the uncertainty regarding the detachment of the marker 3 can be resolved and cost can be reduced owing to the reduction of members and/or process for fixing.

In the drive device 100 according to the present embodiment, the marker 3 is formed so as to be a flat plate including a first medium 31 and a second medium 32, a refractive index of the first medium 31 and a refractive index of the second medium 32 being different from each other. Also, the second medium 32 is periodically arranged in the first medium 31, and a maximum length of the second medium 32 in a direction parallel with a light receiving surface of the marker 3 is shorter than a wavelength of light emitted from the light source 2.

Thus, according to the drive device 100 of the present embodiment, since the shape of the second medium 32 included in the marker 3 is deformed and the light intensity of light reflected from the marker 3 changes, the magnitude of strain generated in the drive unit 1 can be detected by converting the detected light intensity to the amount of strain. Also, since the detectable range of the amount of strain depends on the wavelength of light emitted from the light source 2 and the length of the diameter of the second medium 32, strain caused by a nanometer-size deformation can be detected by setting the nanometer-sized wavelength of light emitted from the light source 2 and the nanometer-sized length of the diameter of the second medium 32. Needless to say, the detection of strain caused by a micrometer-size or more deformation is possible by setting the wavelength of light emitted from the light source 2, the size of structures, the material or the like appropriately.

In the drive device 100 according to the present embodiment, gas is accommodated in an area where the second medium is to be accommodated.

Thus, according to the drive device 100 of the present embodiment, since stress or the like does not occur between the first medium 31 and the second medium 32, robustness can be insured with respect to the repetition of deformation.

Although the present invention is described based on an embodiment of the present invention, the present invention is not limited to the embodiment described above and can be modified within the scope of the present invention.

[Modification]

Figure 14:
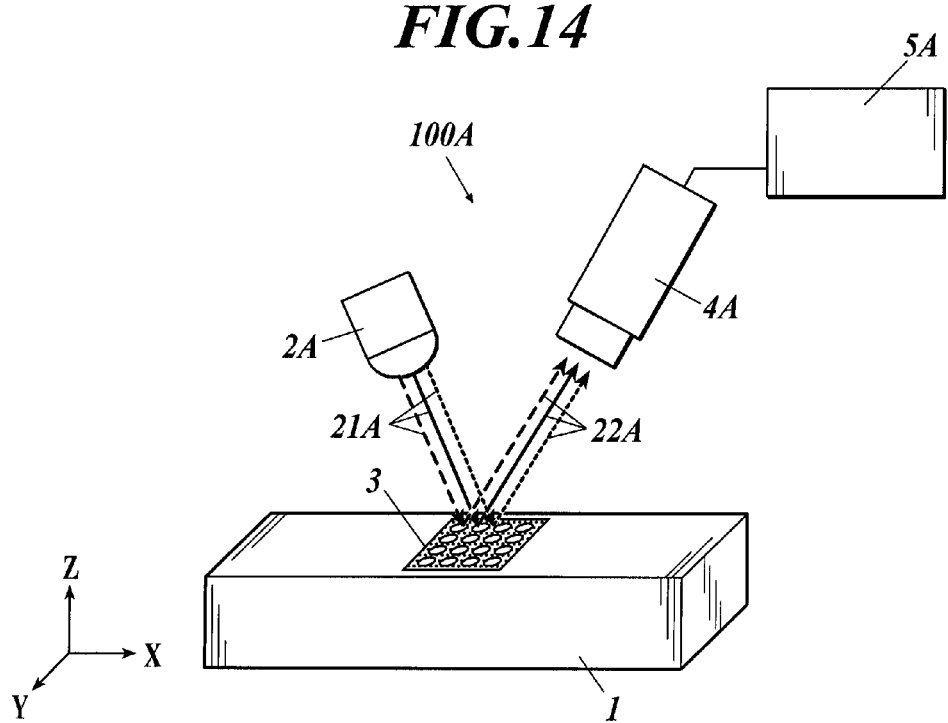
FIG. 14 is a view showing schematic configuration of a drive device according to a modification.

For example, in an example shown in FIG. 14, the configurations of a light source 2A, a detection unit 4A and a signal processing unit 5A are different in comparison to the drive device 100 of the embodiment. For ease of explanation, same reference numeral is given and detailed explanation is omitted with respect to a configuration similar to that of the embodiment.

Specifically, as shown in FIG. 14, the light source 2A of the drive device 100A according to the modification emits light fluxes (incident light 21A) linearly polarized in directions different from one another.

The detection unit 4A detects the light intensity and polarization direction of light flux (reflected light 22A) reflected from the marker 3.

The signal processing unit 5A calculates the direction of strain and the amount of strain based on the light intensity and the polarization direction of the reflected light 22A output from the detection unit 4A. Specifically, the signal processing unit 5A calculates the amount of strain based on the table data which shows the correspondence between the light intensity and the amount of strain in the calculated direction of strain.

As described above, in the drive device 100A according to modification, the light source 2A emits a plurality of light fluxes polarized in a direction parallel with a light receiving surface of the marker 3, the plurality of light fluxes being polarized in directions different from each other. Also, the detection unit 4A further detects a polarization direction of light reflected from the marker 3, and the signal processing unit 5A calculates a direction of strain which occurs in the marker 3 based on the light intensity and the polarization direction detected by the detection unit 4A.

Thus, according to the drive device 100A of the modification, since the light intensity of reflected light of a plurality of directions of polarization can be detected, the direction of maximum strain can be detected based on the difference of the light intensity of each polarization direction. The amount of strain in the direction of maximum strain can be detected based on the light intensity of the detected direction of maximum strain.

Therefore, according to the drive device 100A of the modification, the strain of the drive unit 1 can be retrieved as two-dimensional information.

[Other Modification]

In the embodiment described above, the second medium 32 is arranged in the first medium 31 in a grid-like pattern. However, this is not limitative. For example, like the marker 3A shown in FIG. 15, the second media 32 adjacent to each other in X direction may be arranged so as to be shifted from each other by δy in Y direction.

Figure 15:
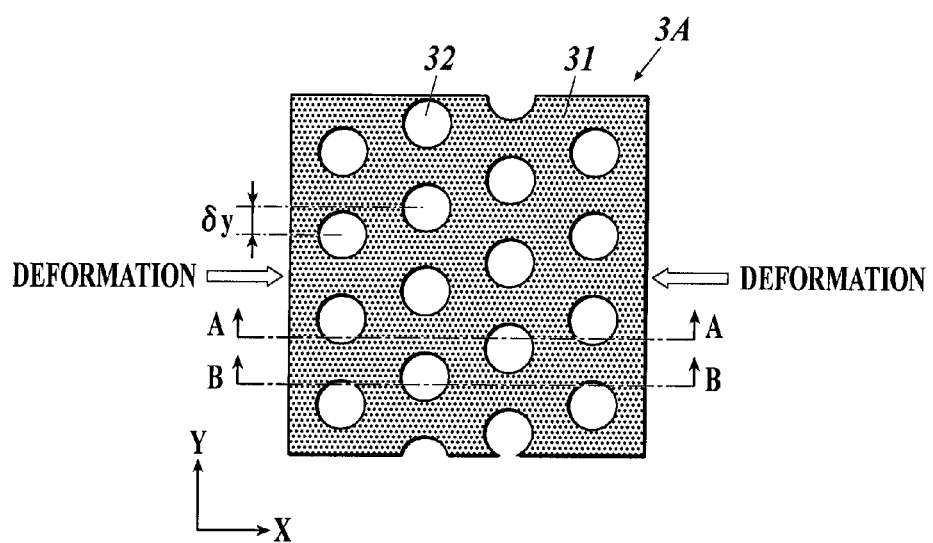
FIG. 15 is a plan view showing a modification of a configuration of a marker.
Figure 16:
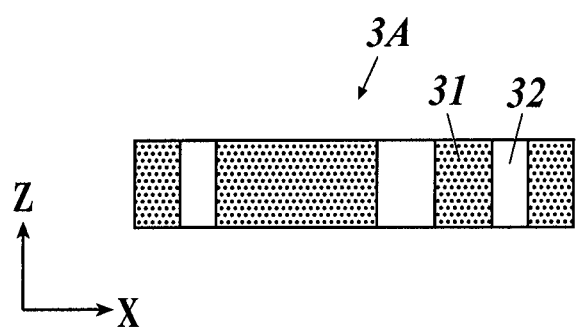
FIG. 16 is a cross-sectional view taken through line A-A in FIG. 15.
Figure 17:
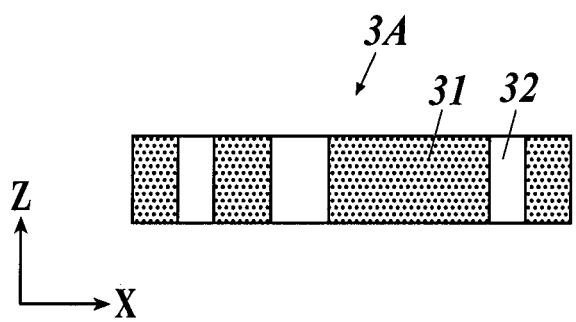
FIG. 17 is a cross-sectional view taken through line B-B in FIG. 15.

In the marker 3A, since the first medium 31 and the second medium 32 are arranged as described above, the direction of deformation and the periodic direction of the second medium 32 are not parallel with each other. Thus, when any cross-section is created along the direction parallel with the direction of deformation (X direction in the drawing), the ratio of areas of the media (the first medium 31 and the second medium 32) on each of the cross-sections is substantially constant. For example, as shown in FIGS. 15 to 17, when the cross-section along line A-A in FIG. 15 (cross-section A; refer to FIG. 16) and the cross-section along line B-B in FIG. 15 (cross-section B; refer to FIG. 17) are compared with each other, the ratio of areas of the media is substantially the same. The fact that the ratio of area of each medium is substantially the same on each of cross-sections means that the apparent modulus of elasticity on each cross-section is substantially the same.

Most preferably, in the marker 3A, the ratio of areas of media on each cross-section which is parallel with the direction of deformation is the same. However, this is not limitative. That is, if at least one second medium 32 is arranged along the direction parallel with the direction of deformation, the variation in the ratio of areas of media on each cross-section is reduced. Thus, the variation of the apparent modulus of elasticity at each position can be reduced.

As described above, by arranging at least one second medium 32 along the direction parallel with the direction of deformation of the marker 3A, the variation of the ratio of areas of media along the direction parallel with the direction of strain (direction of deformation) of the marker 3A can be reduced. Thus, the variation of the apparent modulus of elasticity at each position of the marker 3A can be reduced.

Therefore, the maximum value of the amount of strain which can be detected by the marker 3A can be increased.

In the embodiment described above, the drive unit 1 and the first medium 31 of the marker 3 is formed of an alloy including palladium. However, this is not limitative. For example, the drive unit 1 and the first medium 31 of the marker 3 may be formed of a hydrogen storage material other than palladium. The drive unit 1 and the first medium 31 of the marker 3 may be formed of a metal other than a hydrogen storage material (for example, a magnetic shape-memory alloy).

In the embodiment described above, the marker 3 is integrally formed on the surface of drive unit 1. However, this is not limitative. For example, the marker 3 may be formed separately from the drive unit 1 and the marker 3 and the drive unit 1 may be welded with each other.

By forming the marker 3 separately from the drive unit 1 as described above, time and cost necessary for forming operation can be reduced because forming the marker 3 is made easier.

The drive unit 1 of the present invention may include a member associated with the drive unit 1 (such as a transmission member). That is, the marker 3 may be formed on the surface of a member associated with the drive unit 1. Owing to this, even when the marker 3 is arranged indirectly with respect to the drive unit 1, the strain can be detected while both rapid detection and high impact resistance are realized.

In the embodiment described above, the area which accommodates the second medium 32 is formed so as to have a true circle shape having a center axis in Z direction (direction perpendicular to the light receiving surface of the marker 3) in a plan view. However, this is not limitative. The area which accommodates the second medium 32 may have any shape such as an ellipsoidal shape and a rectangular shape, if it has a shape whose maximum length parallel with the light receiving surface of the marker 3 is smaller than the wavelength of light emitted from the light source 2.

In the embodiment described above, a material whose modulus of elasticity is smaller than that of the first medium 31 is used for the second medium 32. However, this is not limitative. That is, a material whose modulus of elasticity is smaller than that of the first medium 31 is preferable for the second medium 32. However, a material whose modulus of elasticity is comparable with or smaller than the modulus of elasticity of the first medium 31 may be used for the second medium 32.

In the embodiment described above, the amount of strain is calculated based on a table data (refer to FIG. 12) which shows the correspondence between the light intensity and the amount of strain. However, it is not limitative. For example, the amount of strain may be calculated by a predetermined formula based on the light intensity detected by the detection unit 4, for example.

In the embodiment described above, the configuration in which light flux emitted from the light source 2 is reflected from the marker 3 is explained as an example. This is not limitative. For example, by making the marker 3 and the drive unit 1 transparent, the marker 3 and the drive unit 1 transmits the light flux emitted from the light source 2. In this case, the detection unit 4 is disposed at the destination of the light flux emitted from the light source 2 and trans-mitted through the marker 3 and the drive unit 1, and detects the spectral intensity of light transmitted through the marker 3.

Thus, since the amount of strain can be measured using the light transmitted through the marker 3 and drive unit 1, measurement accuracy can be improved in comparison to the measurement using reflected light.

A temperature measurement unit which measures the temperature of the marker 3 and the drive unit 1 may be provided and the signal processing unit 5 may calculate Young's modulus of the marker 3 and the drive unit 1 based on the temperature measured at the temperature measurement unit.

Thus, since the measurement value can be compensated using the calculated Young's modulus, the measurement accuracy of the amount of strain can be improved further.

In the embodiment described above, as shown in FIG. 1, the light source 2 and the detection unit 4 are disposed distant from each other. This is not limitative. That is, the light source 2 and the detection unit 4 may be disposed adjacent to each other, and the light source 2 may emit light in the direction substantially perpendicular to the light receiving surface of the marker 3.

Thus, since light incident on the marker 3 substantially perpendicular to the marker 3, the spectral intensity of light flux due to the incident angle can be suppressed as small as possible, and the measurement accuracy of the amount of strain can be insured.

In addition, the detailed configuration and detailed operation of each device which constitutes the drive device can be modified without departing from the scope of the present invention.

According to one aspect of a preferred embodiment of the present invention, there is provided a drive device including:

a drive unit configured to include at least a material which generates a plasmon, the drive unit generating strain in response to input energy;

a light source which emits light;

a marker formed on a surface of the drive unit, wherein strain occurs in the marker in accordance with a deformation of the drive unit and the marker reflects or transmits light emitted from the light source;

a detection unit which detects a light intensity of light reflected from or transmitted through the marker;

a signal processing unit which calculates an amount of strain which occurs in the marker based on the light intensity detected by the detection unit; and a controller which controls an amount of strain of the drive unit based on the amount of strain calculated by the signal processing unit, wherein the marker includes, on the surface of the drive unit, a periodic fine structure, a size of the fine structure being equal to or smaller than a wavelength of light emitted from the light source.

In accordance with the drive device, strain can be detected while rapid detection and high impact resistance are realized at the same time.

The entire disclosure of Japanese Patent Application No. 2016-019387 filed on Feb. 4, 2016 is incorporated herein by reference in its entirety.

What is claimed is:
1. A drive device comprising:
 a drive member which includes at least a material which generates a plasmon, the drive member generating strain in response to input energy;
 a light source which emits light;

a marker formed on a surface of the drive member, wherein strain occurs in the marker in accordance with a deformation of the drive member and the marker reflects or transmits light emitted from the light source;

a detector which detects a light intensity of light reflected from or transmitted through the marker;

a signal processor which calculates an amount of strain which occurs in the marker based on the light intensity detected by the detector; and a strain controller which controls an amount of strain of the drive member based on the amount of strain calculated by the signal processing unit, wherein the marker includes, on the surface of the drive member, a periodic fine structure, a size of the fine structure being equal to or smaller than a wavelength of light emitted from the light source.

2. The drive device according to claim 1, wherein the drive member and the marker are composed of a material including at least a hydrogen storage alloy.

3. The drive device according to claim 2, wherein the hydrogen storage alloy is an alloy including palladium.

4. The drive device according to claim 1, wherein the marker is formed integrally with the drive member.

5. The drive device according to claim 1, wherein the marker comprises a flat plate including a first medium and a second medium, a refractive index of the first medium and a refractive index of the second medium being different from each other, the second medium is periodically arranged in the first medium, and a maximum length of the second medium in a direction parallel with a light receiving surface of the marker is shorter than a wavelength of light emitted from the light source.

6. The drive device according to claim 5, wherein the second medium is arranged such that at least one second medium exists in a direction parallel with a direction of deformation of the marker.

7. The drive device according to claim 5, wherein gas is accommodated in an area where the second medium is to be accommodated.

8. The drive device according to claim 1, wherein the light source emits a plurality of light fluxes polarized in directions different from each other, the detector further detects a polarization direction of light reflected from or transmitted through the marker, and the signal processor calculates a direction of strain which occurs in the marker based on the light intensity and the polarization direction detected by the detection unit.

9. A method of controlling strain of a drive device including a drive member which includes at least a material which generates a plasmon, the drive member generating strain in response to input energy; a light source which emits light; a marker formed on a surface of the drive member, wherein strain occurs in the marker in accordance with a deformation of the drive member and the marker reflects or transmits light emitted from the light source and wherein the marker includes a periodic fine structure, a size of the fine structure being equal to or smaller than a wavelength of light emitted from the light source, the method comprising steps of:

detecting a light intensity of light reflected from or transmitted through the marker;

calculating an amount of strain which occurs in the marker based on the detected light intensity; and controlling an amount of strain of the drive member based on the calculated amount of strain.

10. A non-transitory computer readable storage medium storing a program thereon which causes a computer of a drive device including a drive member which includes at least a material which generates a plasmon, the drive member generating strain in response to input energy; a light source which emits light; a marker formed on a surface of the drive member, wherein strain occurs in the marker in accordance with a deformation of the drive member and the marker reflects or transmits light emitted from the light source and wherein the marker includes a periodic fine structure, a size of the fine structure being equal to or smaller than a wavelength of light emitted from the light source, to function as units, comprising:

a detector which detects a light intensity of light reflected from or transmitted through the marker;

a signal processor which calculates an amount of strain which occurs in the marker based on the light intensity detected by the detector; and a strain controller which controls an amount of strain of the drive member based on the amount of strain calculated by the signal processor.

* * * * *